US012626268B2

(12) United States Patent
Menon et al.

(10) Patent No.: US 12,626,268 B2
(45) Date of Patent: May 12, 2026

(54) METHOD AND SYSTEM FOR OPTIMIZING OPERATION AND PRICE OF AN ENERGY STORAGE AS A SERVICE (ESaaS)

(71) Applicant: Tata Consultancy Services Limited, Mumbai (IN)

(72) Inventors: Vishnu Padmakumar Menon, Pune (IN); Yogesh Kumar Bichpuriya, Pune (IN); Narayanan Rajagopal, Bangalore (IN); Venkatesh Sarangan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 44 days.

(21) Appl. No.: 18/656,730

(22) Filed: May 7, 2024

(65) Prior Publication Data

US 2024/0386452 A1     Nov. 21, 2024

(30) Foreign Application Priority Data

May 16, 2023     (IN) .............................. 202321034354

(51) Int. Cl.
*G06Q 30/02*     (2023.01)
*G06Q 30/0202*     (2023.01)

(52) U.S. Cl.
CPC ................................ *G06Q 30/0202* (2013.01)

(58) Field of Classification Search
None
See application file for complete search history.

(56) References Cited

U.S. PATENT DOCUMENTS 10,628,838 B2 *   4/2020   Ghosh ................ G06Q 30/0202
2019/0165580 A1 *   5/2019   Doherty ............... G05B 13/042
(Continued)

FOREIGN PATENT DOCUMENTS

WO     WO 2022/063908 A1     3/2022

OTHER PUBLICATIONS

Lin et al. (Revenue Prediction for Integrated Renewable Energy and Energy Storage System using Machine Learning Techniques, Journal of Energy Storage, vol. 50, 2022, 104123, ISSN 2352-152X, https://doi.org/10.1016/j.est.2022.104123, pp. 1-13, Accepted Jan. 27, 2022).*

(Continued)

*Primary Examiner* — Matthew D Henry
(74) *Attorney, Agent, or Firm* — Finnegan, Henderson, Farabow, Garrett & Dunner, LLP

(57) ABSTRACT

The embodiments of present disclosure address a need of a framework to holistically utilize storage capacity of an Energy Storage System (ESS) to serve forecast errors of several Renewable Energy Generators (REGens) participating in a day-ahead market. Embodiments herein provide a method and system for optimizing the operation and price of an Energy Storage as a Service (ESaaS) framework. In anticipation of the forecast errors from REGens, the ESS operator takes suitable countermeasures such as charging/discharging of storage system through market transactions. This is done in a way to reduce imbalance in the market commitments made by individual REGens without reserving any storage volume for each REGen. Further, the system is configured to schedule the storage, determine the settlement volumes, and decide the service prices. The disclosed ESaaS framework is beneficial for all entities such as REGens (revenue outflow decreases), system operator (imbalance volume reduces), and ESS (revenue earned increases).

9 Claims, 8 Drawing Sheets

(56)        References Cited

U.S. PATENT DOCUMENTS

2020/0403403 A1*  12/2020  Ye ..................... H01M 10/4285
2023/0169434 A1*   6/2023  Kumar ................. G06Q 10/067
                                                       705/7.37
2024/0386452 A1*  11/2024  Menon ............... G06Q 30/0202

OTHER PUBLICATIONS

Krishnamurthy et al., "Energy Storage Arbitrage Under Day-Ahead
and Real-Time Price Uncertainty," (2017).
Talluri et al., "Optimal Battery Energy Storage System Scheduling
within Renewable Energy Communities," Energies, 14 (2021).

* cited by examiner

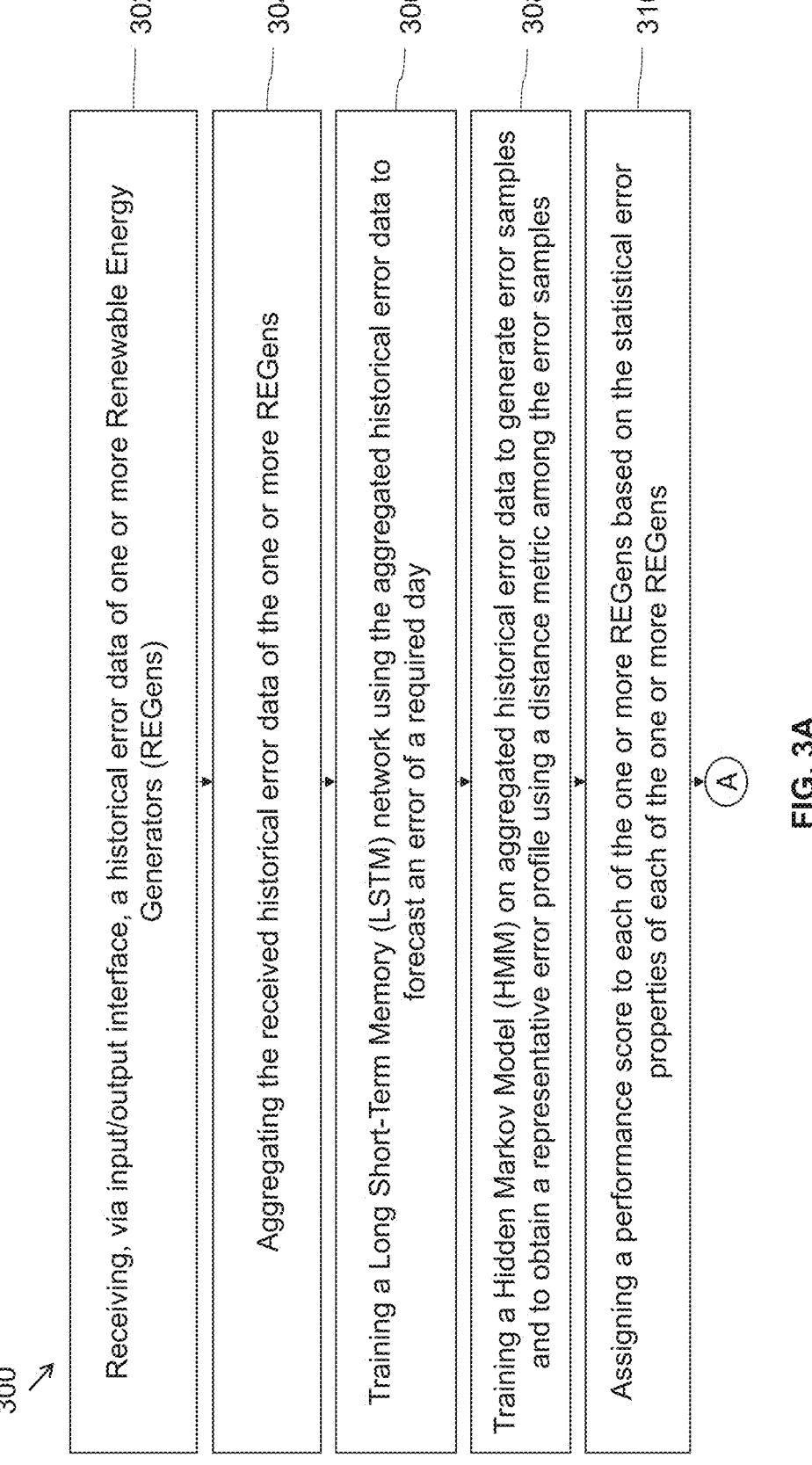

300

302 — Receiving, via input/output interface, a historical error data of one or more Renewable Energy Generators (REGens)

304 — Aggregating the received historical error data of the one or more REGens

306 — Training a Long Short-Term Memory (LSTM) network using the aggregated historical error data to forecast an error of a required day 308 — Training a Hidden Markov Model (HMM) on aggregated historical error data to generate error samples and to obtain a representative error profile using a distance metric among the error samples 310 — Assigning a performance score to each of the one or more REGens based on the statistical error properties of each of the one or more REGens

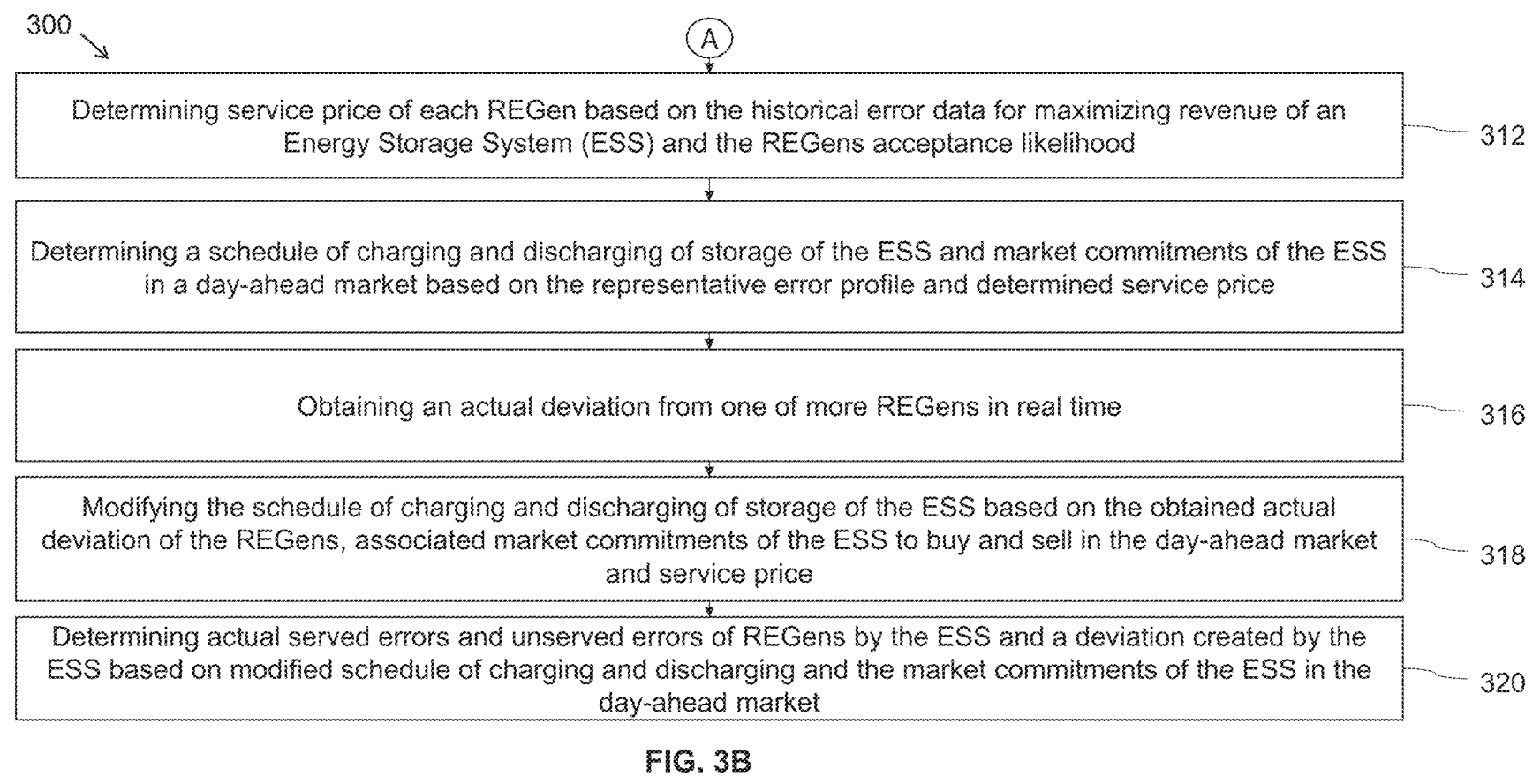

Determining service price of each REGen based on the historical error data for maximizing revenue of an Energy Storage System (ESS) and the REGens acceptance likelihood

314

Determining a schedule of charging and discharging of storage of the ESS and market commitments of the ESS in a day-ahead market based on the representative error profile and determined service price

316

Obtaining an actual deviation from one of more REGens in real time

318

Modifying the schedule of charging and discharging of storage of the ESS based on the obtained actual deviation of the REGens, associated market commitments of the ESS to buy and sell in the day-ahead market and service price

320

Determining actual served errors and unserved errors of REGens by the ESS and a deviation created by the ESS based on modified schedule of charging and discharging and the market commitments of the ESS in the day-ahead market

FIG. 3B

METHOD AND SYSTEM FOR OPTIMIZING OPERATION AND PRICE OF AN ENERGY STORAGE AS A SERVICE (ESaaS)

PRIORITY CLAIM

This U.S. patent application claims priority under 35 U.S.C. § 119 to Indian application Number 202321034354, filed on May 16, 2023. The entire content of the abovementioned application is incorporated herein by reference.

TECHNICAL FIELD

The disclosure herein generally relates to the field of energy storage services (ESS) and more specifically, to a method and system for optimizing operation and price of an energy storage as a service (ESaaS).

BACKGROUND

Transiting to a sustainable economy mandates tight integration of renewable energy generation with mainstream power grids. These Renewable Energy Generators (REGens) earn revenue by selling their power output to others. Since bilateral contracts are less lucrative in the short-term, the REGens focus on electricity markets also to auction their power. As trading in intraday markets requires a more sophisticated set-up, the REGens target day-ahead markets too. However, nature induced stochastic variations in generation introduces risks in terms of volume commitments that can be made by the REGens in day-ahead markets. Any deviation from the commitments in the day-ahead market leads to penalties or settlement at imbalance prices.

The REGens can minimize the risk of deviating from market commitments with the help of an energy storage system (ESS). The ESS storage can be charged to store excess power during over-generation and discharged during periods of under-generation. However, most of existing set-ups consider ESS either dedicated for one REGen or shared across a group of REGens. When the ESS is shared across REGens, almost all the works reserve a fraction of storage volume for each REGen.

SUMMARY

Embodiments of the disclosure present technological improvements as solutions to one or more of the above-mentioned technical problems recognized by the inventors in conventional systems. For example, in one embodiment, a method and system for optimizing price and operation of an energy storage as a service (ESaaS) is provided.

In one aspect, a processor-implemented method for optimizing price and operation of an energy storage as a service (ESaaS) is provided. The processor-implemented method includes one or more steps such as receiving, via input/ output interface, a historical error data of one or more Renewable Energy Generators (REGens), wherein the historical error data is a deviation between an actual generation and a committed generation. Further, the processor-implemented method includes aggregating the received historical error data of the one or more REGens, training a Long Short-Term Memory (LSTM) network using the aggregated historical error data to forecast an error of a required day and training a Hidden Markov Model (HMM) on the aggregated historical error data to generate one or more error samples to obtain a representative error profile using a minimization of least-absolute distance among the error samples.

Furthermore, the processor-implemented method comprising assigning a performance score to each of the one or more REGens based on one or more statistical error properties of each of the one or more REGens, determining a service price of each of the one or more REGens based on the received historical error data using an optimization framework for maximizing revenue of the ESS and the one or more REGens acceptance likelihood and determining, via the one or more hardware processors, a schedule of charging and discharging of storage of the ESS and market commitments of the ESS in a day-ahead market based on the representative error profile and determined service price. Further, the processor-implemented method comprising obtaining an actual deviation from one of more REGens in real time and modifying the schedule of charging and discharging of storage of the ESS based on the obtained actual deviation of the one or more REGens, associated market commitments of the ESS of buy and sell in the day-ahead market and the determined service price. Finally, the actual served errors and unserved errors of each REGens by ESS and deviations created by ESS are determined based on modified schedules and ESS market commitments in the day-ahead market.

In another aspect, a system for optimizing price and operation of an energy storage as a service (ESaaS) is provided. The system includes an input/output interface configured to receive a historical error data of one or more Renewable Energy Generators (REGens), wherein the historical error data is a deviation between an actual generation and a committed generation, one or more hardware processors and at least one memory storing a plurality of instructions, wherein the one or more hardware processors are configured to execute the plurality of instructions stored in the at least one memory.

Further, the system is configured to aggregate the received historical error data of the one or more REGens, train a Long Short-Term Memory (LSTM) network using the aggregated historical error data to forecast an error of a required day, and train a Hidden Markov Model (HMM) on the aggregated historical error data to generate one or more error samples to obtain a representative error profile using a minimization of least-absolute distance among the error samples. Furthermore, the system is configured to assign a performance score to each of the one or more REGens based on one or more statistical error properties of each of the one or more REGens, wherein one or more statistical error properties comprises a time average, a time deviation and a maximum temporal correlation and determine a service price of each of the one or more REGens based on the received historical error data using an optimization framework for maximizing revenue of the ESS and the one or more REGens acceptance likelihood, wherein the determined service price is weighted with the assigned performance score of each of the one or more REGens to get a final price per unit of the forecasted error served.

Furthermore, the system is configured to determine a schedule of charging and discharging of storage of the ESS and market commitments of the ESS in a day-ahead market based on the representative error profile and determined service price, obtain an actual deviation from one of more REGens in real time, and modify the schedule of charging and discharging of storage of the ESS based on the obtained actual deviation of the one or more REGens, associated market commitments of the ESS of buy and sell in the day-ahead market and the determined service price. Finally, the system is configured to determine the actual served errors and unserved errors of each REGens by ESS and deviations created by ESS based on modified schedules and ESS market commitments in day ahead market.

In yet another aspect, one or more non-transitory machine-readable information storage mediums are provided comprising one or more instructions, which when executed by one or more hardware processors causes a method for optimizing price and operation of an energy storage as a service (ESaaS) is provided.

The processor-implemented method includes one or more steps such as receiving, via input/output interface, a historical error data of one or more Renewable Energy Generators (REGens), wherein the historical error data is a deviation between an actual generation and a committed generation. Further, the processor-implemented method includes aggregating the received historical error data of the one or more REGens, training a Long Short-Term Memory (LSTM) network using the aggregated historical error data to forecast an error of a required day and training a Hidden Markov Model (HMM) on the aggregated historical error data to generate one or more error samples to obtain a representative error profile using a minimization of least-absolute distance among the error samples.

Furthermore, the processor-implemented method comprising assigning a performance score to each of the one or more REGens based on one or more statistical error properties of each of the one or more REGens, determining a service price of each of the one or more REGens based on the received historical error data using a predefined optimization framework for maximizing revenue of the ESS and the one or more REGens acceptance likelihood and determining, via the one or more hardware processors, a schedule of charging and discharging of storage of the ESS and market commitments of the ESS in a day-ahead market based on the representative error profile and determined service price. Further, the processor-implemented method comprising obtaining an actual deviation from one of more REGens in real time and modifying the schedule of charging and discharging of storage of the ESS based on the obtained actual deviation of the one or more REGens, associated market commitments of the ESS of buy and sell in the day-ahead market and the determined service price. Finally, the processor-implemented method comprising determining the actual served errors and unserved errors of each REGens by ESS and deviations created by ESS based on modified schedules and ESS market commitments in day ahead market.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B is an exemplary flow diagram to illustrate a method for optimizing price and operation of an energy storage as a service (ESaaS), in accordance with some embodiments of the present disclosure.

DETAILED DESCRIPTION

Figure 1:
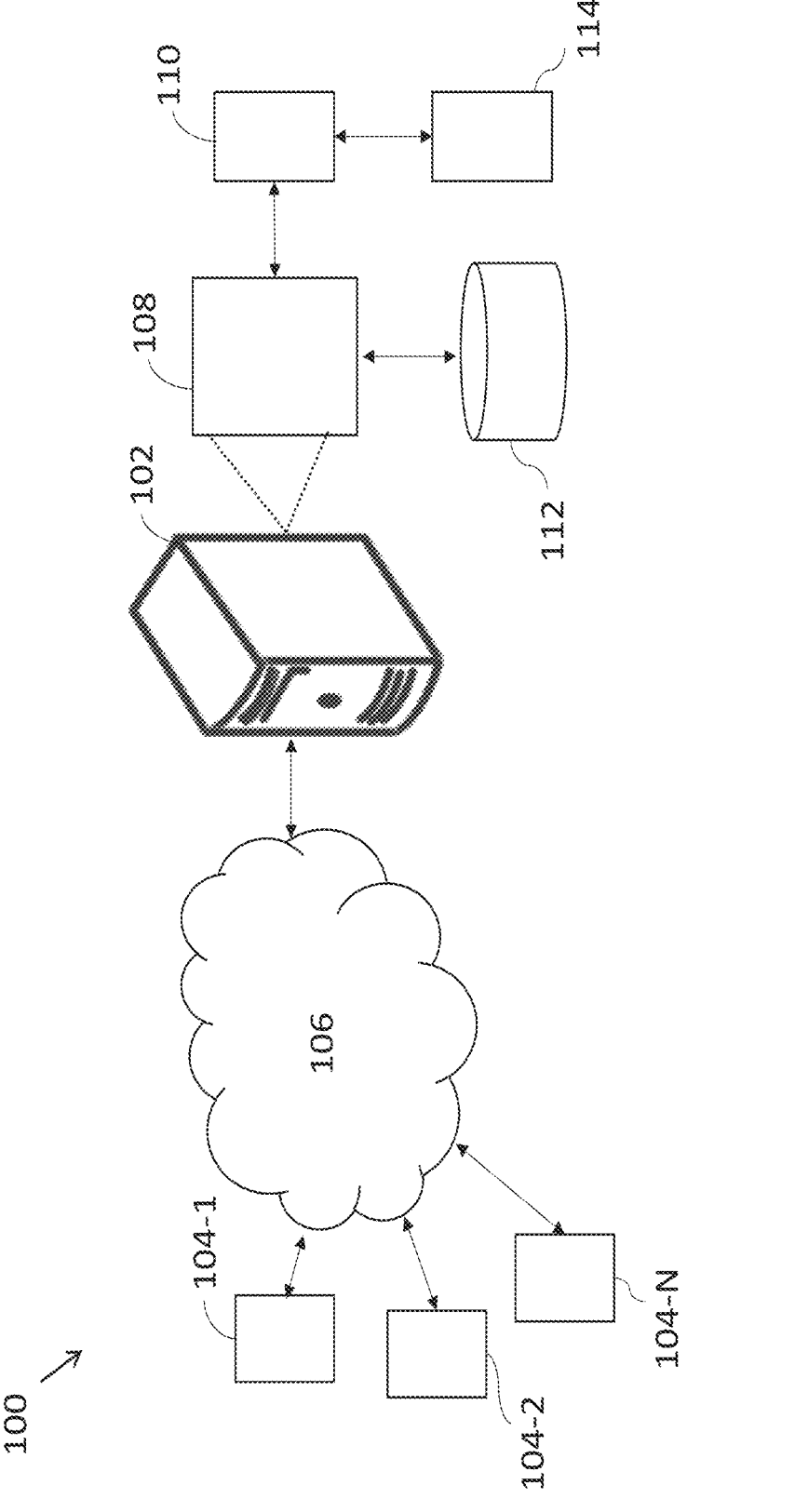
FIG. 1 illustrates a block diagram of an exemplary system for optimizing price and operation of an energy storage as a service (ESaaS), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

One way to share an Energy Storage System (ESS) across one or more Renewable Energy Generators (REGens) is to holistically use the storage to serve them without reserving any storage for each of the one or more REGens. The ESS operator can dynamically charge/discharge storage in anticipation of the deviations in the generation volumes of its subscribers. This is done so as to reduce the imbalances in the commitments made by each of the one or more REGens in electricity markets. In return, each REGen pays a fee to the ESS operator that is commensurate with the deviation volumes served. The embodiments herein provide a method and system for optimizing price and operation of an energy storage as a service (ESaaS). Herein, the storage operator utilizes the available storage capacity in entirety for the benefit of the one or more REGens served by it without reserving a dedicated storage volume for each of the one or more REGens. The technical improvements, in turn contributing to operational benefits provided by a framework disclosed by the system herein are as follows:

(i) A REGen need not invest in any ESS and digress beyond its core business of generation. Consequently, it also need not worry about stranded investments. These are especially beneficial for small and medium sized renewable farms connected to the grid.

(ii) Since a REGen is paying only for its own deviation volumes actually served by the storage operator, it is cost-effective in comparison to renting a dedicated storage volume as there is no paid-for capacity that is left unused.

(iii) By serving multiple REGens holistically on a best-effort basis (and not reserving capacities for individual REGens), the ESS operator is effectively utilizing available storage via statistical multiplexing.

(iv) An ESS operator can dynamically leverage the unused storage volume (if any) for other applications (such as market arbitrage) allowing them to earn additional revenues.

(v) The ESS operator too can benefit from this set-up due to the overall reduction in market commitment deviations of the REGens.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 illustrates a block diagram of a system 100 for optimizing price and operation of an energy storage as a service (ESaaS), in accordance with an example embodiment. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

Figure 2:
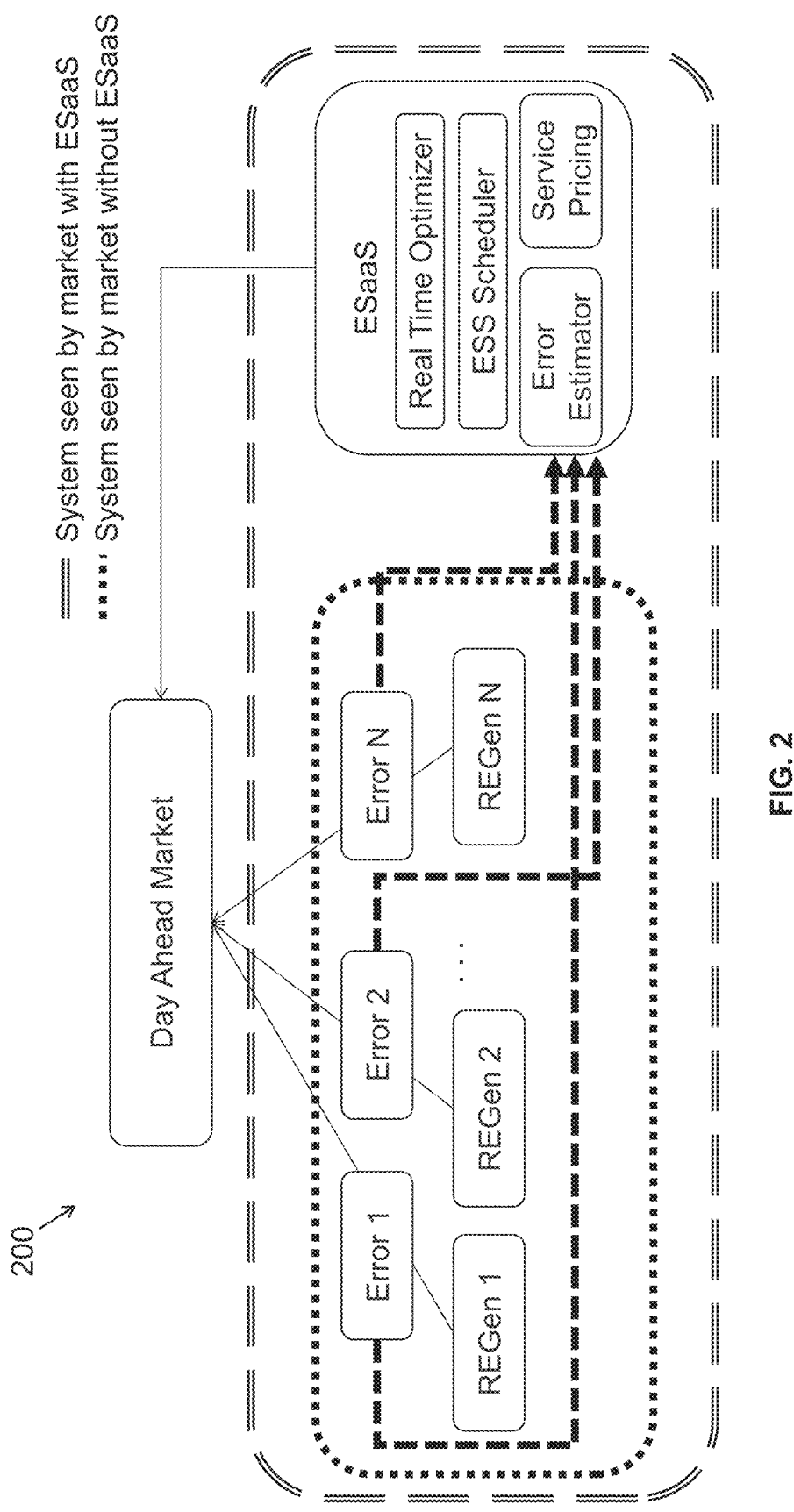
FIG. 2 is a functional block diagram of the system for optimizing price and operation of an energy storage as a service (ESaaS) using FIG. 1, in accordance with some embodiments of the present disclosure.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the computing devices 102 of the system 100 comprise at least one memory 110 with a plurality of instructions, one or more databases 112, and one or more hardware processors 108 which are communicatively coupled with the at least one memory 110 to execute a plurality of modules 114 therein. The plurality of modules, as shown in FIG. 2, include but are not limited to a real time optimizer, an error estimator, an ESS scheduler, and a service pricing module. The components and functionalities of the system 100 are described further in detail in FIG. 2 and FIG. 3.

FIG. 2 is a functional block diagram of the system 100 for optimizing price and operation of an energy storage as a service (ESaaS) using FIG. 1, in accordance with some embodiments of the present disclosure. In one aspect, one or more geographically distributed and independently operated Renewable Energy Generators (REGens) connected to a transmission system of a grid participate in a day-ahead electricity market. An energy storage system (ESS) is also connected to the transmission system. Each of the one or more REGens has an independent best-effort ESaaS tie-up with the ESS.

In an embodiment, let $e_i(t)$ denote the error or real-time deviation observed in the day-ahead volume committed by REGen to the day-ahead electricity market for delivery time slot t. Further, let $$e_i^s(t)$$

denote the error volume served by the ESS by charge or discharge of its storage from/to the grid by a certain quantum during delivery slot. Let $$e_i^m(t)$$

denote the remaining error not served by the ESS through its storage, but by market trade. Apart from the above charge/discharge and buy/sell interactions, the ESS may also transact with the day-ahead electricity market on its own as a trader for arbitrage. There may be deviations in these volume commitments too made by the ESS to the day-ahead electricity market.

FIGS. 3A and 3B is an exemplary flow diagram illustrating a processor-implemented method 300 for optimizing price and operation of an energy storage as a service (ESaaS) implemented by the system of FIG. 1. Functions of the components of the system 100 are now explained with reference to FIG. 2 through steps of flow diagram in FIG. 7, according to some embodiments of the present disclosure.

In an embodiment, the system 100 comprises one or more data storage devices or the memory 110 operatively coupled to the processor(s) 104 and is configured to store instructions for execution of steps of the method 300 by the processor(s) or one or more hardware processors 108. The steps of the method 300 of the present disclosure will now be explained with reference to the components or blocks of the system 100 as depicted in FIG. 1 and the steps of flow diagram as depicted in FIGS. 3A and 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Initially at step 302 of the method 300, a historical error data of one or more Renewable Energy Generators (REGens) is received, via an input/output interface 104, as an input. Herein, the historical error data is a deviation between an actual generation and a committed generation.

In one illustration, wherein a REGen i, interested in a best-effort energy storage service, shares the historical values of its market deviation error signal $e_i(t)$ with an ESS B. Based on this, the ESS B determines an appropriate service price pi. The REGen i has to pay €pi for every MWh of deviation volume served by the ESS B. The REGen i may decline the price offer in which case it will not receive any service from the ESS B. If the REGen i accepts the price offer, it also starts sharing with the ESS B its updated error forecasts for each time slot obtained just before the delivery. Based on the historical values and real-time updates of $e_i(t)$, the ESS B offers a best-effort ESaaS for REGen i. For delivery slot t, the ESS B commits certain volume in the day-ahead market based on the estimated errors of all REGens being served and also operates the storage appropriately during t so as to reduce the net market deviation at t. At the end of each day with T delivery slots, the following monetary charges are calculated. REGen i approximately pays the following to ESS B for utilizing the best-effort ESaaS—

$$p_i \sum\nolimits_{t=1}^{T} (|e_i^s(t)| + |e_i^m(t)|) \qquad (1)$$

REGen i approximately pays to an ESS operator a sum of:

$$\sum\nolimits_{t \in T_i^+} \zeta^+(t)(|e_i(t)| - |e_i^s(t)| - |e_i^m(t)|) + \qquad (2)$$

$$\sum\nolimits_{t \in T_i^-} \zeta^-(t)(|e_i(t)| - |e_i^s(t)| - |e_i^m(t)|)$$

wherein T+i and T−i refer to the set of time slots where REGen i has positive and negative imbalances respectively. This amount is towards the positive or negative imbalances not served by ESS B. The ESS B approximately pays the system operator for its own positive and negative market commitment deviations the following amount:

$$\sum\nolimits_{t \in T_i^+} \zeta^+(t)|e_B(t)| + \sum\nolimits_{t \in T_i^-} \zeta^-(t)|e_B(t)| \qquad (3)$$

At the next step 304 of the method 300, the one or more hardware processors 108 are configured by the programmed instructions to aggregate the received historical error data of the one or more REGens. Let $e_{a,g}(t) = \Sigma_i e_i(t)$, be the aggregate of the error signals across one or more REGens served by the ESS.

At the next step 306 of the method 300, the one or more hardware processors 108 are configured by the programmed instructions to train a Long Short-Term Memory (LSTM) network using the aggregated historical error data to forecast an error of a required day.

At the next step 308 of the method 300, the one or more hardware processors 108 are configured by the programmed instructions to train a Hidden Markov Model (HMM) on the aggregated historical error data to generate one or more error samples and to obtain a representative error profile using a distance metric among the error samples.

At the next step 310 of the method 300, the one or more hardware processors 108 are configured by the programmed instructions to assign a performance score to each of the one or more REGens based on the one or more statistical error properties of each of the one or more REGens. The one or more statistical error properties comprises a time average, a time deviation and a maximum temporal correlation and the like.

At the next step 312 of the method 300, the one or more hardware processors 108 are configured by the programmed instructions to determine a service price of each of the one or more REGens based on the received historical error data for maximizing revenue of an Energy Storage System (ESS) and the one or more REGens acceptance likelihood. The determined service price is weighted with the assigned performance score of each of the one or more REGens to get a final price per unit of the error served.

It would be appreciated that the REGen i initially shares historical values of its forecast errors $e_i(t)$ with the ESS. In response, the ESS quotes a service price to offer its service to REGen i. Let pi indicate the price paid by REGen i to the ESS for every MWh of volume deviation served by the ESS. Wherein, the pricing mechanism adheres to several characteristics:

(i) The value of pi determined cannot be higher than the imbalance prices (for the REGens to subscribe) and lower than the day-ahead market price (for the ESS to offer the service).

(ii) The REGens that have more uncertainty in their forecast errors should be priced higher than REGens with less uncertainty.

(iii) The value of pi should not depend on the population of other REGens being served by the ESS else, the pricing mechanism become unstable with the need for determining a new price arising whenever a new REGen subscribes to the ESaaS or when an existing REGen leaves the service.

In general, the one or more REGens expect the service price quoted by the ESS to be lower. Lower the price, higher the propensity of the one or more REGens to adopt the best-effort ESaaS offered by the ESS. The likelihood π (pi) of the one or more REGens is determined to accept a price via a sigmoid function.

$$\pi(p_i) = 2\left(\frac{e^{-(p_i - p_{min})}}{1 + e^{-(p_i - p_{min})}}\right), \quad p_{min} \le p_i \le p_{max} \qquad (4)$$

where $p_{min}$ and $p_{max}$ are the lower and upper bounds for the price respectively which are chosen by the ESS. The values of $p_{min}$ and $p_{max}$ are set by the ESS to be some percentile values of the distributions of the day-ahead market clearing price and market imbalance prices respectively. The value of pi also depends on the statistical properties of i's historical error signals. A well-behaved error signal from i is the one that reduces the work to be done by the ESS for neutralizing it. The error signal is characterized to be well behaved if it has lower numerical values for the following:

Time Average, $\eta_i$: Since the REGens are participating in day-ahead markets, the error values obtained over a sequence of T delivery slots constitutes one sample realization. An error signal $e_i(t)$ with a low time average (i.e., $\eta_i = \int \int_T e_i(t) \, dt \, e_i$) is preferred since the average storage SoC values needed for serving such signals remain lower.

Time deviation of $\sigma_i$: An error signal with a lower deviation across consecutive samples (i.e., $\sigma_i = \int T |e_i(t) - e_i(t-1)| dt$) is preferred since the power rating of storage needed for serving such signals is lower.

Maximum Temporal Correlation $\rho_i$: An error signal $e_i(t)$ that has a high temporal correlation with itself is not preferred. In such signals, the error accumulates and hence the storage capacity needed to serve such signals increases over time. This temporal correlation is quantified as:

$$\rho_i = \max\left(\int_t^{t+\tau} e_i(s) ds, \, t \in [0, T], \, \tau \in [0, T]\right) \qquad (5)$$

From the values of $\eta_i$, $\sigma_i$, and $\rho_i$, a performance score, $\beta_i$, is determined for each of the one or more REGens which represents the strain on the storage induced by the error profiles of that REGen. The value of $\beta_i$ should be higher for the one or more REGens that have high values in any of $\eta$, $\sigma$ and $\rho$ or a combination of these.

At the next step 314 of the method 300, the one or more hardware processors 108 are configured by the programmed instructions to determine a schedule of charging and discharging of storage of the ESS and market commitments of the ESS in a day-ahead market based on the representative error profile and determined service price.

An ESS scheduler as disclosed in FIG. 2 first determines the charge/discharge schedule of the ESS based on the estimated value of aggregated error $\hat{e}_{ag}(t)$ obtained a day before the delivery. The ESS scheduler also decides the buy/sell volumes for the ESS in the day-ahead market. Assuming $$\hat{e}_{ag}^s, \hat{e}_{ag}^m, \hat{v}_B \quad \hat{e}_{ag}(t)$$

to be known 1. Further, the ESS scheduler determines a schedule of charging/discharging of the ESS. For ease of understanding, an input parameter x(t) to the optimization framework will be indicated in a different style as x(t).

Furthermore, an important metric for the ESS scheduler is to maximize the deviation error for the one or more REGens. In case the values of $e_i(t)$ are not high, the revenue earned by the ESS from the REGens will be small too. To enhance the financial viability of the ESS, the scheduler also increases the revenue earning potential of the ESS through other means such as market arbitrage. Accordingly, the objective function of the ESS scheduler is given by:

$$\max_{\hat{e}_{ag}^s, \hat{e}_{ag}^m, \hat{v}_B} \sum_{t=1}^{T} \left[ \overline{p} \left( \hat{e}_{ag}^{s+}(t) + \hat{e}_{ag}^{s-}(t) \right) - \mu \left( \hat{e}_{ag}^{m+}(t) + \hat{e}_{ag}^{m-}(t) \right) \right] + \tag{6}$$

$$\sum_{t=1}^{T} \hat{\lambda}(t) \left( \hat{v}_B^s(t) - \hat{v}_B^b(t) \right)$$

wherein, the first term corresponds to the revenue earned by the ESS via servicing the REGen volume deviations (i.e., errors). The parameter $\overline{p}$ refers to the average price paid by the REGens to the ESS. The variables $$\hat{e}_{ag}^{s+}(t)$$

and $$\hat{e}_{ag}^{s-}(t)$$

refer to the positive and negative aggregate volume deviations of the REGens respectively served by the ESS based on forecasted aggregate error. When the aggregate error estimates are positive (i.e., excess generation is expected), the ESS absorbs $$\hat{e}_{ag}^{s+}(t)$$

quantum of energy from the grid at t to charge its storage. Similarly, when the aggregate error estimates are negative (i.e., deficit in generation), the ESS compensates by supplying $$\hat{e}_{ag}^{s-}(t)$$

quantum of energy to the grid at t by discharging its storage. The variables $$\hat{e}_{ag}^{m+}(t)$$

and $$\hat{e}_{ag}^{m-}(t)$$

refer to the positive and negative aggregate volume deviations that are not directly served by the ESS using its storage at t. Instead, the ESS serves them indirectly by trading these volumes in the day-ahead market to reduce the imbalance.

$$\hat{e}_{ag}^{m+}(t)$$

is traded as a sell offer at t while $$\hat{e}_{ag}^{m-}(t)$$

is traded as a buy bid. Their sum, weighted by a Lagrangian like constant $\mu$, has been added to the objective function as an explicit penalty for not servicing the REGen errors through the storage. Servicing the forecast errors through storage is preferred since, the storage charge/discharge schedule can be adjusted via a refinement module to account for any inaccuracies that might have crept in during $$\hat{e}_{ag}(t)$$

estimation.

The second summation term quantifies the revenue earned by the ESS through market arbitrage.

$$\hat{v}_B^s(t)$$

and $$\hat{v}_B^b(t)$$

refer to the volume of energy sold and bought by the ESS in the market at t respectively solely for arbitrage. These volumes are not for REGen error compensation. At any given t, only one of $$\hat{v}_B^s(t)$$

and $$\hat{v}_B^b(t)$$

will be non-zero. Here $\hat{\lambda}(t)$ refers to the day-ahead market's clearing price at $t$ as estimated by the ESS.

The decision variables $$\hat{e}_{ag}^{s+}(t), \hat{e}_{ag}^{s-}(t), \hat{e}_{ag}^{m+}(t)$$

and $$\hat{e}_{ag}^{m-}(t)$$

are related to the aggregated error signal as:

$$\hat{e}_{ag}^{s+}(t) + \hat{e}_{ag}^{m+}(t) = \hat{e}_{ag}^{+}(t) \tag{7}$$

$$\hat{e}_{ag}^{s-}(t) + \hat{e}_{ag}^{m-}(t) = \hat{e}_{ag}^{-}(t) \tag{8}$$

The error volumes served, and the market transactions planned are also governed by the capacity constraints of the storage.

$$\hat{v}_B^{b,M}(t) + \hat{e}_{ag}^{s+}(t) \le Z_t \times R_B(SoC(t)) \tag{9}$$

$$\hat{v}_B^{s,M}(t) + \hat{e}_{ag}^{s-}(t) \le (1 - Z_t) \times R_B(SoC(t)) \tag{10}$$

wherein, $R_B(SoC(t))$ refers to the maximum rate of the storage for charging and discharging at the current state of charge (SoC). It is to be noted that the function $R_B(SoC(t))$ could be non-linear in terms of SoC. $Z_t$ is a binary variable that determines whether the storage is charging ($Z_t=1$) or discharging ($Z_t=0$). Further, the decision variables should also adhere to the continuity in the storage SoC levels.

$$SoC(t) = SoC(t-1) + \hat{v}_B^b(t) + \hat{e}_{ag}^{s+}(t) - \hat{v}_B^s(t) - \hat{e}_{ag}^{s-}(t) \tag{11}$$

The SoC levels have to be maintained between the prescribed limits which is enforced in the following constraint.

$$SoC_{min} \le SoC(t) \le SoC_{max} \tag{12}$$

All decision variables are non-negative. The direction of power flow is reflected in the operator used.

$$\hat{s}_{ag}^{s+}(t), \hat{e}_{ag}^{s-}(t), \hat{s}_{ag}^{m+}(t), \hat{e}_{ag}^{m-}(t), \hat{v}_B^s(t), \hat{v}_B^b(t) \ge 0 \tag{13}$$

wherein, at t, the total sell offer volume placed in the market by the ESS is given by $$\hat{e}_{ag}^{m+}(t) + \hat{v}_B^s(t).$$

Similarly, the total buy bid volume placed by the ESS is given by $$\hat{e}_{ag}^{m-}(t) + \hat{v}_B^b(t).$$

These market trades of the ESS are determined based on the aggregate forecast error $$\hat{e}_{ag}(t)$$

that is estimated a day ahead of the actual power delivery.

At the next step 316 of the method 300, the one or more hardware processors 108 are configured by the programmed instructions to obtain an actual deviation from one of more REGens in real time. The actual aggregate error $e_{ag}(t)$ can deviate significantly from these day ahead estimates $\hat{e}_{ag}t)$. The charge/discharge schedule and market trades based on such day-ahead estimates may not necessarily maximize the volume of the actual REGen forecast errors served by the ESS.

Figure 4:
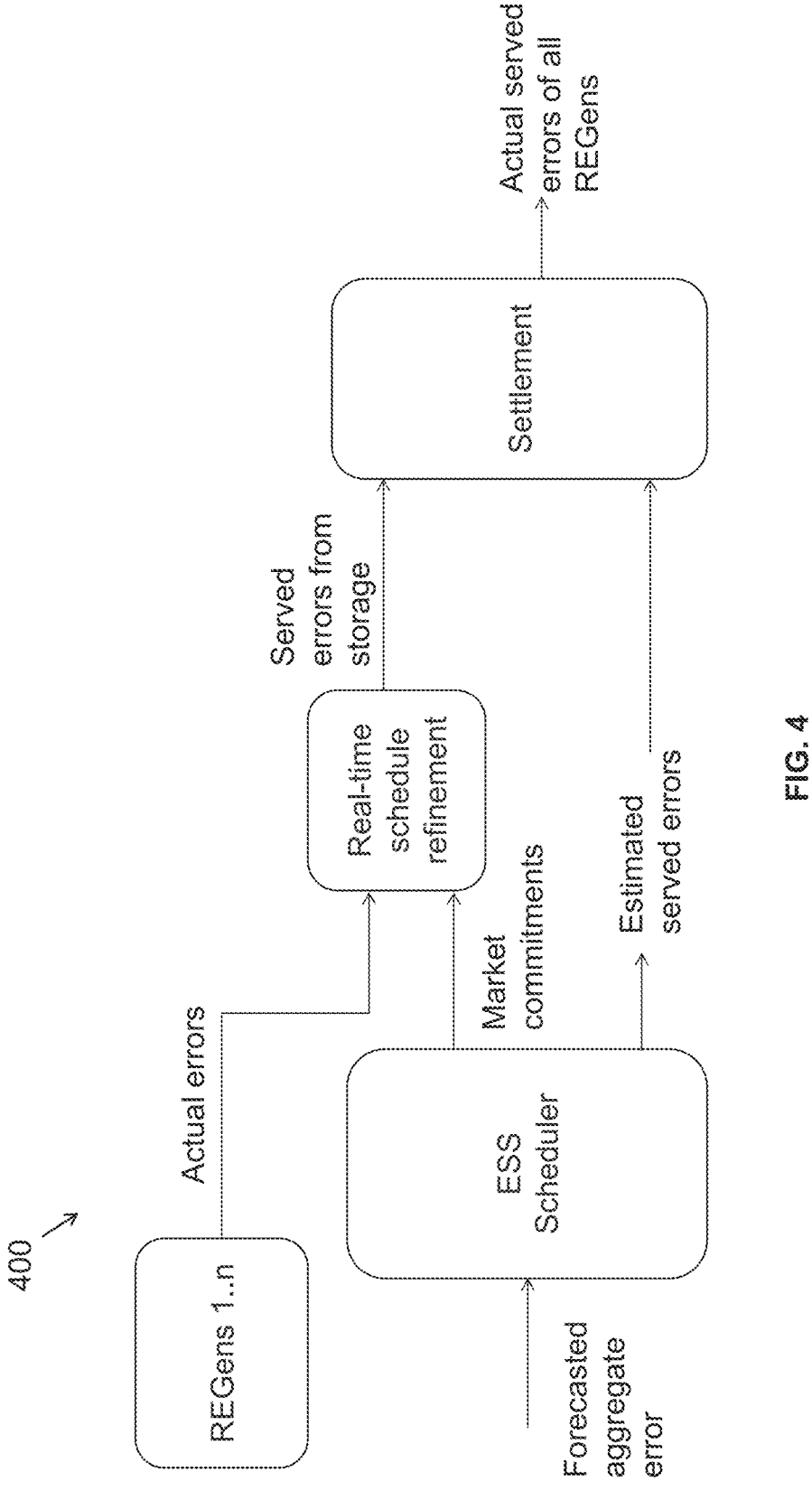
FIG. 4 is a block diagram to illustrate an optimization framework of an energy storage as a service (ESaaS), in accordance with some embodiments of the present disclosure.

FIG. 4 is a block diagram 400 to illustrate the real time optimizer of FIG. 2 of an energy storage as a service (ESaaS), in accordance with some embodiments of the present disclosure. It can be assumed that at a time slot $t=\tau-1$, the latest version of the errors in the generation forecasts (almost the true errors) of individual REGens at $\tau$ become known. At $t=t\tau1$, the charge/discharge schedule of the ESS at $\tau$ is adjusted through an optimization framework that uses: (i) the true error values at $\tau$, $e_i(\tau)$, (ii) the day-ahead error estimates for all delivery slots later than $\Sigma$, and (iii) the trade volumes committed by the ESS for all delivery slots, these are obtained from the day-ahead scheduling routine. As time advances, the charge/discharge schedule of the ESS gets refined for all the T delivery slots in the day-ahead market. The objective of the refinement is to maximize the volume deviation error served by the ESS.

$$\max_{e_{ag}^s, e_{ag}^n, l^b, l^s, e_i^s, e_i^n} \sum_{i=1}^{N} p_i(e_i^{s+}(\tau) + e_i^{s-}(\tau)) - \tag{14}$$

$$\sum_{i=1}^{N} \mu\left(e_i^{n+}(\tau) + e_i^{n-}(\tau) + l^b(t) + l^s(t)\right) +$$

$$\sum_{t=\tau+1}^{T} \overline{p}\left(e_{ag}^{s+}(t) + e_{ag}^{s-}(t)\right) - \sum_{t=\tau+1}^{T} \mu\left(e_{ag}^{n+}(t) + e_{ag}^{n-}(t) + l^b(t) + l^s(t)\right)$$

wherein the variables $l^b(t)$ and $l^s(t)$ are the slack variables that keep track of the deviations from the buy and sell arbitrage volume commitments respectively made by the ESS in the day-ahead market for delivery slot t.

At the next step 418 of the method 400, the one or more hardware processors 108 are configured by the programmed instructions to modify the schedule of charging and discharging of storage of the ESS based on the obtained actual deviation of the one or more REGens, associated market commitments of the ESS to buy and sell in the day-ahead market and the determined service price.

The modification of the schedule of charging and discharging of storage of the ESS corrects the storage state of charge (SoC) depending on actual REGen errors and determines the deviations that are directly served via the storage namely $$e_i^{s+}(t) \text{ and } e_i^{s-}(t).$$

In case the errors indirectly served by ESS through market transactions are zero, then a schedule refinement module of the system directly gives the actual settlement volume for each REGen through the values of its decision variables. The unserved errors on which the penalty has to be paid by REGen i can be obtained. The market commitments made by the ESS for arbitrage may deviate as well and these are captured in the variables $l^b(t)$ and $l^s(t)$ respectively, i.e., $e_B(t)=l^b(t)+l^s(t)$. The ESS has to pay penalty for these deviations. If the indirectly served errors $$\hat{e}_{ag}^{m+}(t)$$

and $$\hat{e}_{ag}^{m-}(t)$$

at time t were non-zero, they also need to be accounted to determine the final settlement.

Finally at the last step 420 of the method 400, the one or more hardware processors 108 are configured by the programmed instructions to determine actual served errors and unserved errors of each of the one or more REGens by the ESS and a deviation created by the ESS based on modified schedule of charging and discharging and the market commitments of the ESS in the day-ahead market.

Experiment

A framework for ESaaS with a set-up consisting of 8 different REGens is considered for testing. Out of these, four are solar PV generators (with indices i={1, 2, 5, 6}) while the rest are wind turbines (with indices i={3, 4, 7, 8}). All REGens have a capacity of 1 MW. Day-ahead market clearing prices are obtained from the European Power Exchange (EPEX) and the imbalance prices from France's Transmission System Operator (RTE). It is observed that the day-ahead market clearing, and imbalance prices are correlated. The imbalances in both positive and negative direction are penalized, so as to encourage REGens to minimize the net deviation in commitment, thereby reducing the overall system imbalance. The scenarios considered here are No-ESaaS, ESaaS-LSTM and ESaaS-HMM.the overall payment made by the one or more REGens has come down under the ESaaS framework—this validates that the proposed ESaaS framework is indeed beneficial for the one or more REGens. The revenue outflow for the one or more REGens has come down by nearly 11.75% and 13.65% under ESaaS-LSTM and ESaaS-HMM respectively. HMM forecasting seems to perform better than LSTM from REGens' perspective.

Figure 5:
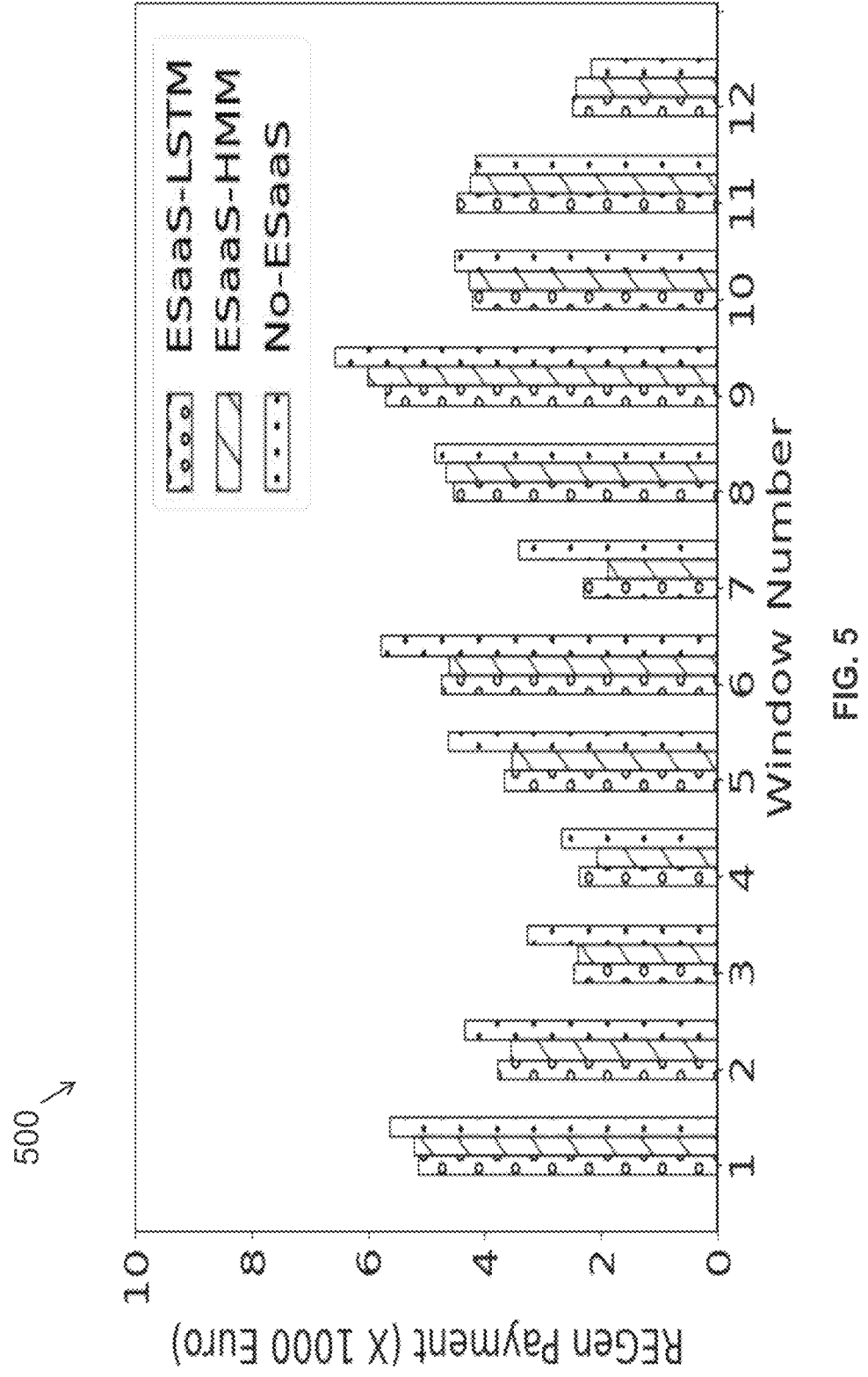
FIG. 5 is a schematic diagram to illustrate a break-up of the REGen outflow under various scenarios across individual test windows, in accordance with some embodiments of the present disclosure.
Figure 6:
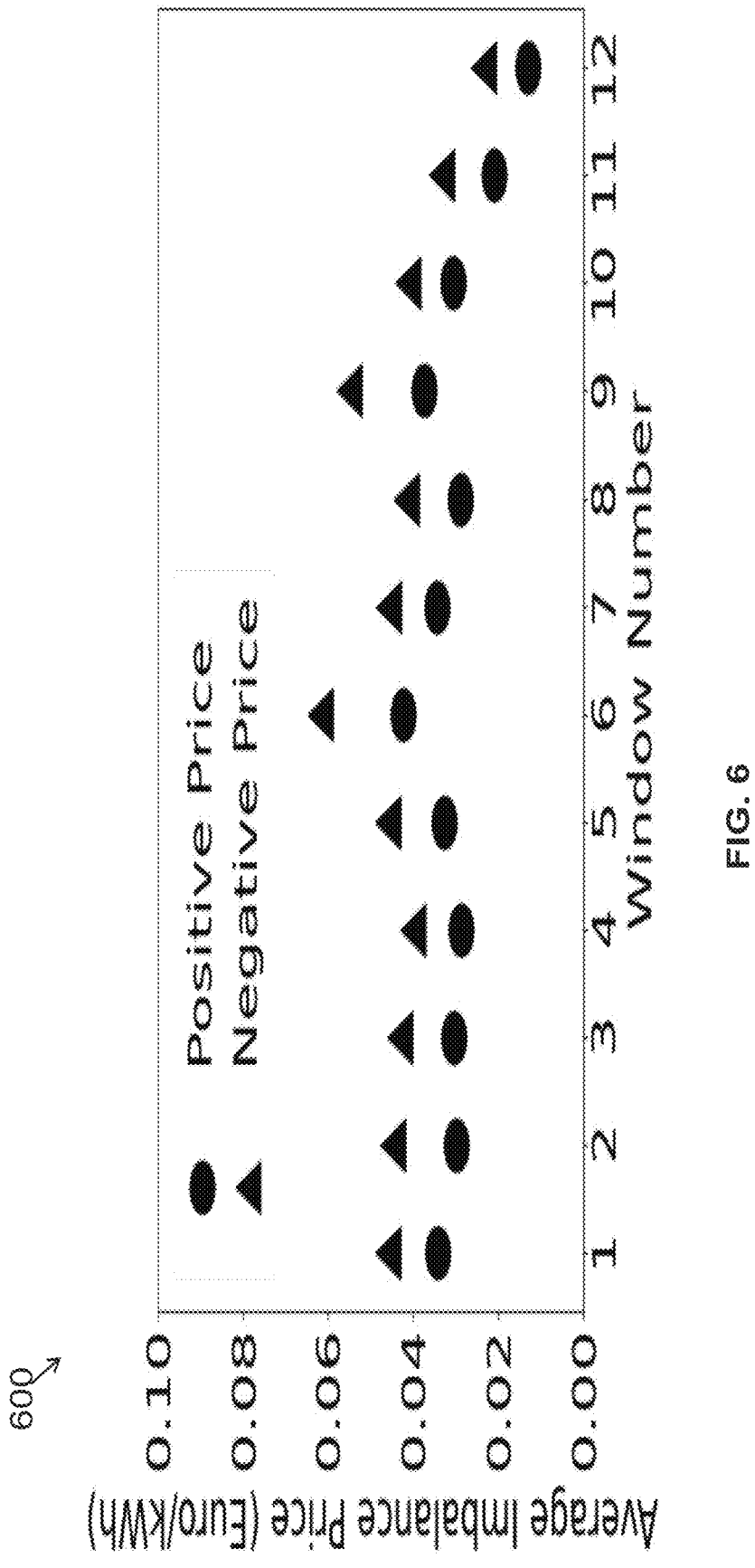
FIG. 6 is a schematic diagram to illustrate the imbalance prices, in accordance with some embodiments of the present disclosure.

FIG. 5 shows the breakup of the REGen revenue outflow under the three scenarios across individual test windows. These windows consist of 5 days each. It is found that the ESS is able to serve REGens better in first 10 windows. In the last two windows, payment under ESaaS is higher than the no-ESaaS scenario. This is because, the imbalance prices in the last two windows are lower than the overall average, as shown in FIG. 6. (The average positive and negative imbalance prices per MWh across the 60 day test duration are €30.25 and €43.42 respectively, while for the last two windows—last 10 days, the averages are €16.87 and €28.24 respectively). Hence, the prices paid by the REGens per MWh becomes higher than the actual imbalance price in these two windows.

Figure 7:
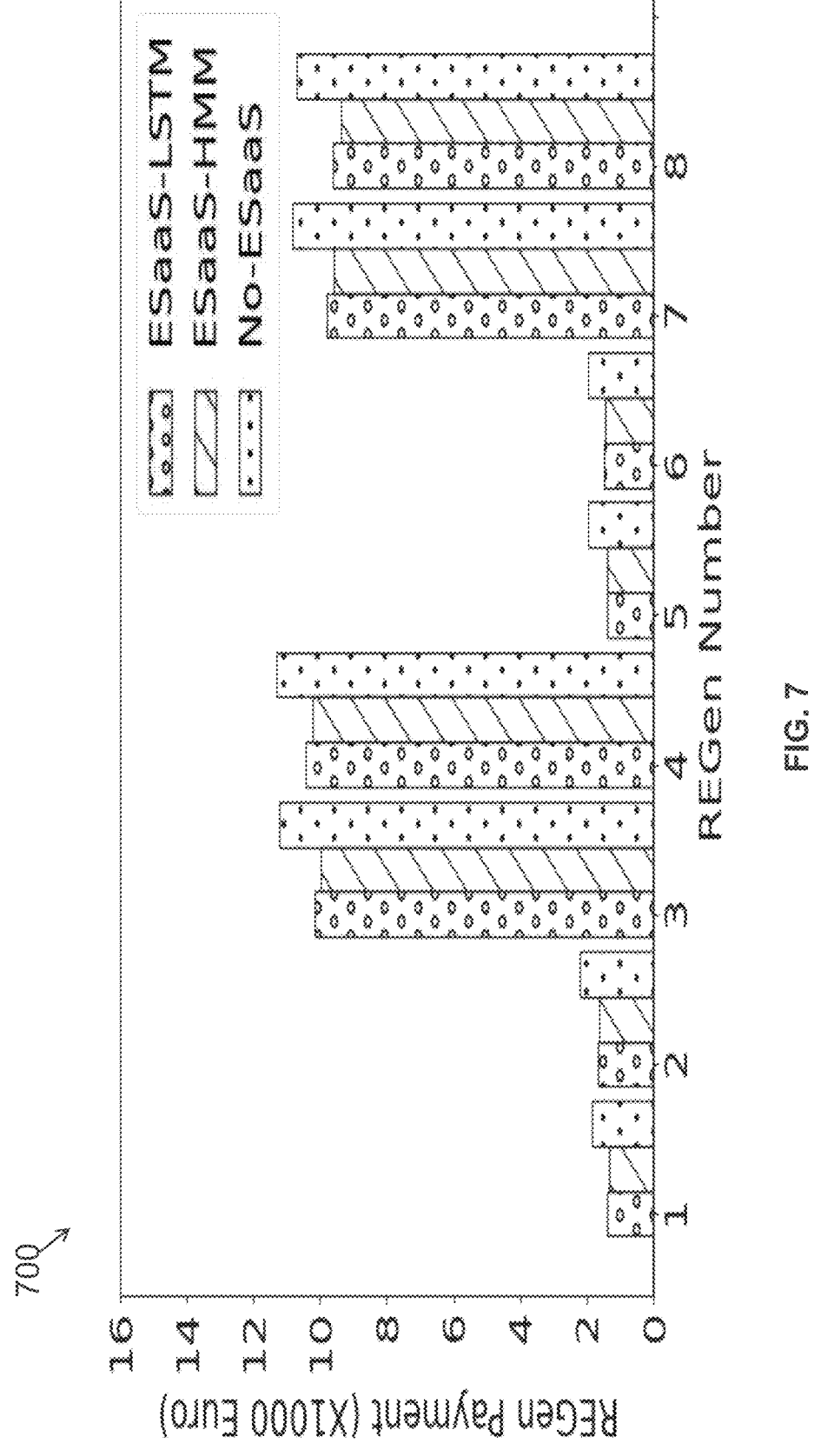
FIG. 7 shows that for each of the eight REGens, ESaaS is able to reduce the payment of REGens, in accordance with some embodiments of the present disclosure.

FIG. 7 shows that for each of the 8 REGens, ESaaS is able to reduce the payment of all REGens by both methods. This implies that even though ESS is serving a population of REGens through the aggregate error signal, each member of the serving population stands to benefit as an individual. Under ESaaS, the ESS is able to serve 49-56% of solar REGen error, while it serves 17-25% of the error of wind REGens. As the error quantity of wind REGens are higher than that of solar PV, depending on ESS capacity and schedule, it is able to handle relatively more error of solar PV. The performance of the ESaaS set-up is tested under a smaller battery size. Even in this scenario, the REGens with higher errors do not starve the REGens with lower errors from receiving the ESS' service.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address a need of a framework to holistically utilize the storage capacity of an energy storage system to serve the forecast errors of the one or more REGens participating in a day-ahead market. Embodiments herein provide a method and system for optimizing operation and price of an Energy Storage as a Service (ESaaS) framework. In anticipation of the forecast errors from these REGens, the ESS operator takes suitable countermeasures (charging/discharging of storage system through market transactions). This is done in a way to reduce the imbalance in the market commitments made by the individual REGens without reserving any storage volume for each REGen. Further, the system is configured to schedule the storage, determine the settlement volumes, and decide the service prices. The disclosed ESaaS framework is beneficial for all entities—REGens (revenue outflow decreases), system operator (imbalance volume reduces), and ESS (revenue earned increases).

Further, the disclosed ESaaS framework is that by using the available storage holistically for all the REGens on a best-effort basis (without reserving smaller storage volumes for individual REGens), the ESS will be able to serve relatively more error across REGens. Conversely, to serve the same error volumes for the REGens as done by the best-effort ESaaS, a higher aggregate storage capacity may be required for the scenario where each REGen has a dedicated storage. In order to test the ESaaS framework, the error volumes are computed to serve for individual REGens under the best-effort ESaaS. Further, the storage size (kWh and kW ratings) needed to serve the same error volumes is computed for each REGen through an optimization framework. Other factors like SoC limits, initial SoC, etc. are assumed to be same as that with ESaaS. Therefore, it is found that the total capacities of the dedicated storages used by individual REGens comes to 33.75 MWh—as opposed to 25 MWh originally used by the best-effort ESaaS. Having a dedicated storage for each REGen leads to nearly 35% increase in the storage size needed to serve the same volume of error. This shows that the best-effort service framework is able to utilize the available storage more effectively.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:

receiving, via input/output interface, a historical error data of one or more Renewable Energy Generators (REGens), wherein the historical error data is a deviation between an actual generation and a committed generation;

aggregating, via one or more hardware processors, the received historical error data of the one or more REGens, wherein a REGen i, interested in a best-effort energy storage service, shares historical values of its market deviation error signal with an Energy Storage System ESS and the ESS determines an appropriate service price, wherein based on the historical values and real-time updates of the market deviation error signal, the ESS offers a best-effort Energy Stored as a Service ESaaS for REGen i;

training, via the one or more hardware processors, a Long Short-Term Memory (LSTM) network using the aggregated historical error data to forecast an error of a required day, wherein when the aggregate historical error estimates are positive the ESS absorbs a predefined quantum of energy from a grid to charge the storage of the ESS, wherein when the aggregate historical error estimates are negative the ESS compensates by supplying a predefined quantum of energy to the grid by discharging the storage of the ESS;

training, via the one or more hardware processors, a Hidden Markov Model (HMM) on the aggregated historical error data to generate one or more error samples and to obtain a representative error profile using a distance metric among the error samples;

assigning, via the one or more hardware processors, a performance score to each of the one or more REGens based on the one or more statistical error properties of each of the one or more REGens;

determining, via the one or more hardware processors, a service price of each of the one or more REGens based on the received historical error data for maximizing revenue of an Energy Storage System (ESS) and acceptance likelihood (pi) of the one or more REGens, wherein the determined service price is weighted with the assigned performance score of each of the one or more REGens to get a final price per unit of the forecasted error served, and wherein the accepted likelihood (pi) of the one or more REGens is determined to accept the service price via a sigmoid function, wherein when the REGen i accepts the price offer, the REGen i starts sharing the updated error forecasts for each time slot obtained just before the delivery with the ESS B;

determining, via the one or more hardware processors, a schedule of charging and discharging of storage of the ESS and market commitments of the ESS in a day-ahead market based on the representative error profile and determined service price;

obtaining, via the one or more hardware processors, an actual deviation from the one of more REGens in real time;

modifying, via the one or more hardware processors, the schedule of charging and discharging of storage of the ESS based on the obtained actual deviation of the one or more REGens, associated market commitments of the ESS to buy and sell in the day-ahead market and the determined service price; and determining, via the one or more hardware processors, actual served errors and unserved errors of each of the one or more REGens by the ESS and a deviation created by the ESS based on modified schedule of charging and discharging and the market commitments of the ESS in the day-ahead market, wherein an ESS operator dynamically charges or discharges storage in anticipation of the deviations in the generation volume of its subscribers and the storage charge or discharge schedule is adjusted to account for inaccuracies, wherein the ESS operator dynamically leverages the unused storage volume for other applications.

2. The processor-implemented method of claim 1, wherein the ESS traded-off aggregated market deviation error in a day-ahead market to reduce imbalance.

3. The processor-implemented method of claim 1, wherein one or more statistical error properties comprises a time average, a time deviation and a maximum temporal correlation.

4. A system comprising:

an input/output interface to receive a historical error data of one or more Renewable Energy Generators (RE-Gens), wherein the historical error data is a deviation between an actual generation and a committed generation;

at least one memory in communication with the one or more hardware processors, wherein the one or more hardware processors are configured to execute programmed instructions stored in the at least one memory to:

aggregate the received historical error data of the one or more REGens, wherein a REGen i, interested in a best-effort energy storage service, shares historical values of its market deviation error signal with an Energy Storage System ESS and the ESS determines an appropriate service price, wherein based on the historical values and real-time updates of the market deviation error signal, the ESS offers a best-effort Energy Stored as a Service ESaaS for REGen i;

train a Long Short-Term Memory (LSTM) network using the aggregated historical error data to forecast an error of a required day, wherein when the aggregate historical error estimates are positive the ESS absorbs a predefined quantum of energy from a grid to charge the storage of the ESS, wherein when the aggregate historical error estimates are negative the ESS compensates by supplying a predefined quantum of energy to the grid by discharging the storage of the ESS;

train a Hidden Markov Model (HMM) on the aggregated historical error data to generate one or more error samples and to obtain a representative error profile using a distance metric among the one or more error samples;

assign a performance score to each of the one or more REGens based on the one or more statistical error properties of each of the one or more REGens;

determine a service price of each of the one or more REGens based on the received historical error data for maximizing revenue of an Energy Storage System (ESS) and acceptance likelihood (pi) of the one or more REGens, wherein the determined service price is weighted with the assigned performance score of each of the one or more REGens to get a final price per unit of the forecasted error served, and wherein the accepted likelihood (pi) of the one or more REGens is determined to accept the service price via a sigmoid function, wherein when the REGen i accepts the price offer, the REGen i starts sharing the updated error forecasts for each time slot obtained just before the delivery with the ESS B;

determine a schedule of charging and discharging of storage of the ESS and market commitments of the ESS in a day-ahead market based on the representative error profile and determined service price;

obtain an actual deviation from the one of more REGens in real time;

modify the schedule of charging and discharging of storage of the ESS based on the obtained actual deviation of the one or more REGens, associated market commitments of the ESS to buy and sell in the day-ahead market and the determined service price; and determine actual served errors and unserved errors of each of the one or more REGens by the ESS and a deviation created by the ESS based on modified schedule of charging and discharging and the market commitments of the ESS in the day-ahead market, wherein an ESS operator dynamically charges or discharges storage in anticipation of the deviations in the generation volume of its subscribers and the storage charge or discharge schedule is adjusted to account for inaccuracies, wherein the ESS operator dynamically leverages the unused storage volume for other applications.

5. The system of claim 4, wherein the ESS traded-off aggregated market deviation error in a day-ahead market to reduce imbalance.

6. The system of claim 4, wherein one or more statistical error properties comprises a time average, a time deviation and a maximum temporal correlation.

7. One or more non-transitory machine-readable information storage mediums comprising one or more instructions which when executed by one or more hardware processors cause:

receiving, via input/output interface, a historical error data of one or more Renewable Energy Generators (RE-Gens), wherein the historical error data is a deviation between an actual generation and a committed generation;

aggregating, via one or more hardware processors, the received historical error data of the one or more REGens, wherein a REGen i, interested in a best-effort energy storage service, shares historical values of its market deviation error signal with an Energy Storage System ESS and the ESS determines an appropriate service price, wherein based on the historical values and real-time updates of the market deviation error signal, the ESS offers a best-effort Energy Stored as a Service ESaaS for REGen i:

training, via the one or more hardware processors, a Long Short-Term Memory (LSTM) network using the aggregated historical error data to forecast an error of a required day, wherein when the aggregate historical error estimates are positive the ESS absorbs a predefined quantum of energy from a grid to charge the storage of the ESS, wherein when the aggregate historical error estimates are negative the ESS compensates by supplying a predefined quantum of energy to the grid by discharging the storage of the ESS;

training, via the one or more hardware processors, a Hidden Markov Model (HMM) on the aggregated historical error data to generate one or more error samples and to obtain a representative error profile using a distance metric among the error samples;

assigning, via the one or more hardware processors, a performance score to each of the one or more REGens based on the one or more statistical error properties of each of the one or more REGens;

determining, via the one or more hardware processors, a service price of each of the one or more REGens based on the received historical error data for maximizing revenue of an Energy Storage System (ESS) and acceptance likelihood (pi) of the one or more REGens, wherein the determined service price is weighted with the assigned performance score of each of the one or more REGens to get a final price per unit of the forecasted error served, and wherein the accepted likelihood (pi) of the one or more REGens is determined to accept the service price via a sigmoid function, wherein when the REGen i accepts the price offer, the REGen 1 starts sharing the updated error forecasts for each time slot obtained just before the delivery with the ESS B;

determining, via the one or more hardware processors, a schedule of charging and discharging of storage of the ESS and market commitments of the ESS in a day-ahead market based on the representative error profile and determined service price;

obtaining, via the one or more hardware processors, an actual deviation from the one of more REGens in real time;

modifying, via the one or more hardware processors, the schedule of charging and discharging of storage of the ESS based on the obtained actual deviation of the one or more REGens, associated market commitments of the ESS to buy and sell in the day-ahead market and the determined service price; and determining, via the one or more hardware processors, actual served errors and unserved errors of each of the one or more REGens by the ESS and a deviation created by the ESS based on modified schedule of charging and discharging and the market commitments of the ESS in the day-ahead market, wherein an ESS operator dynamically charges or discharges storage in anticipation of the deviations in the generation volume of its subscribers and the storage charge or discharge schedule is adjusted to account for inaccuracies, wherein the ESS operator dynamically leverages the unused storage volume for other applications.

8. The one or more non-transitory machine-readable information storage mediums of claim 7, wherein the ESS traded-off aggregated market deviation error in a day-ahead market to reduce imbalance.

9. The one or more non-transitory machine-readable information storage mediums of claim 7, wherein one or more statistical error properties comprises a time average, a time deviation and a maximum temporal correlation.

* * * * *